A. J. GUSTAFSON.
FISH STOP.
APPLICATION FILED JUNE 28, 1916.
1,232,794.
Patented July 10, 1917.
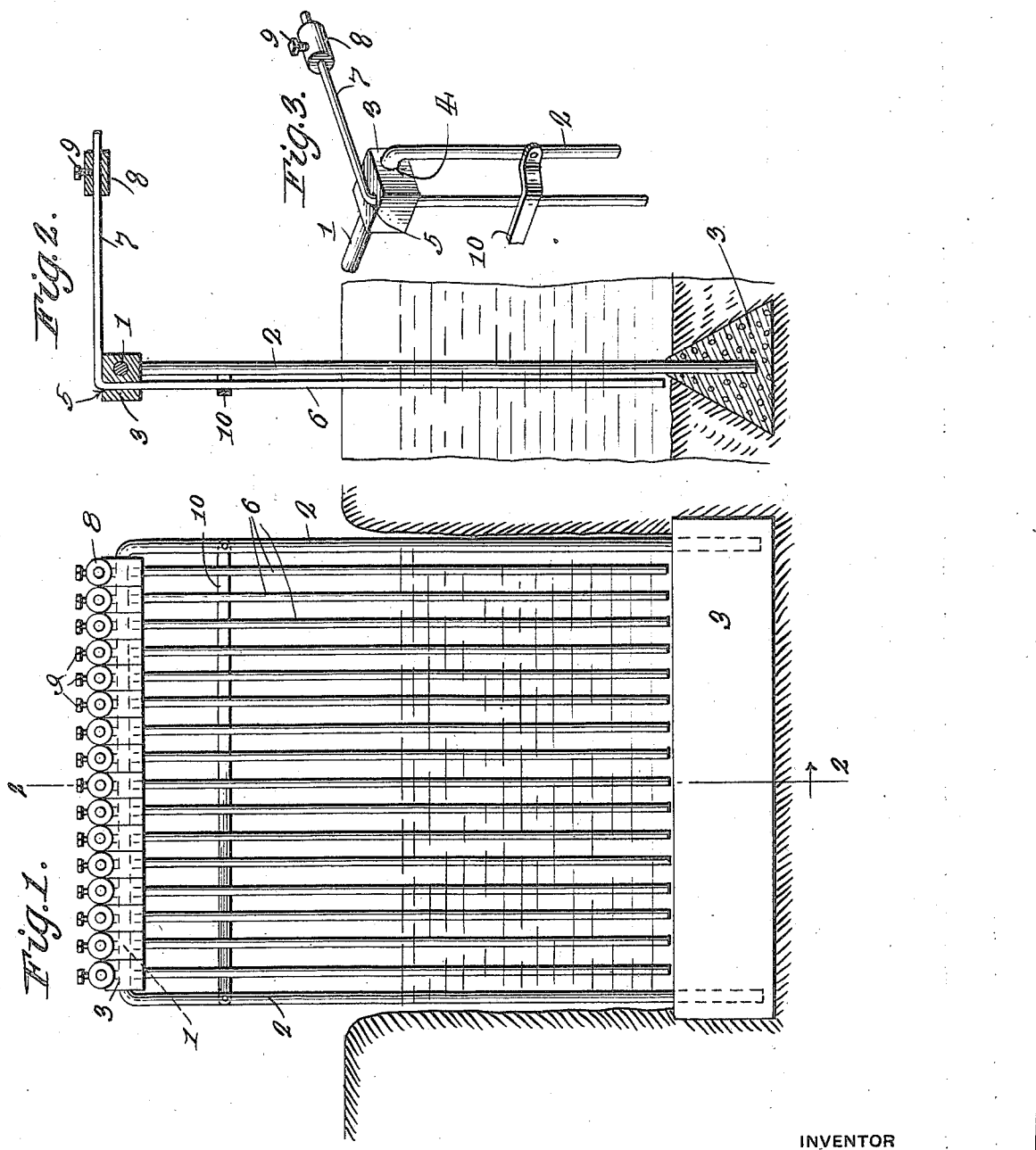
WITNESSES
INVENTOR
Arthur J. Gustafson
BY
ATTORNEY

UNITED STATES PATENT OFFICE.

ARTHUR J. GUSTAFSON, OF HANLEY FALLS, MINNESOTA.

FISH-STOP.

1,232,794.          Specification of Letters Patent.      Patented July 10, 1917.

Application filed June 28, 1916. Serial No. 106,438.

*To all whom it may concern:*

Be it known that I, ARTHUR J. GUSTAFSON, a citizen of the United States, residing at Hanley Falls, in the county of Yellow Medicine and State of Minnesota, have invented certain new and useful Improvements in Fish-Stops, of which the following is a specification.

This invention has relation to fish stops for irrigation ditches, and the nature and objects thereof will be readily apparent to those skilled in the art to which it appertains, in the light of the following explanation of the accompanying drawings, illustrating what I now believe to be the preferred embodiment or mechanical expression of my invention, from among other forms and arrangements within the spirit thereof, or the scope of the appended claims.

However an object of the invention is to provide a barrier adapted to be disposed across an irrigation ditch or other stream of water, which will effectively prevent the passage of fish up stream, but will permit accummulated debris to pass therethrough, thereby keeping the stream clear.

Another object of the invention is to provide a barrier of the character described, which is operated by the force of the stream, and which is adjustable to adapt the same to the head of the stream, or the force with which the water flows.

In addition to the foregoing, my invention comprehends improvements in the details of construction and arrangement of parts, to be hereinafter described and particularly pointed out in the appended claims.

In the accompanying drawings, in which similar and corresponding parts are designated by the same reference characters throughout the several views in which they appear;

Figure 1 is a view in front elevation of a fish stop constructed in accordance with my invention, and illustrating its application to an irrigation ditch.

Fig. 2 is a vertical section on the line 2—2 of Fig. 1, and

Fig. 3 is a detail view in perspective of one of the movable elements comprising the barrier.

With reference to the drawings, my invention comprises a substantially inverted U-shaped frame comprising a horizontal bar 1 and downwardly extending side bars 2, embedded at their lower terminals in a concrete base 3, located in the bed of the stream. The vertical members 2 of the frame are adapted to be disposed at opposite banks of the stream, and in sufficiently close relation thereto, to prevent the passage of fish therebetween.

A plurality of substantially cubical blocks 3 are mounted upon the horizontal bar 1 of the frame, being provided with openings 4 to receive the bar, and also openings 5 extended at right angles to the openings 4, to receive vertical rods 6, bent at right angles over the upper surface of the blocks, with said bent portions directed down stream. The bent portions 7 of the rod 6 are weighted by means of weights 8, apertured to receive the rods, and provided with set screws 9 whereby the weights may be secured to the rods subsequent to their adjustment thereon.

The tendency of the weighted upper terminals 7, is to move the rods 6 out of a vertical position, the vertical portions of the rods being disposed obviously to one side of the horizontal bar 1. The tendency to move out of the vertical is however resisted by a horizontal bar 10, which is extended transversely across the rod 6 on the up stream side thereof, and secured at its ends to the vertical members 2 of the frame. In practice, the length of the vertical portions of the rod 6 should be such as to extend equally above and below the water level.

It will be apparent, that owing to the bar 10, it will be impossible for fish to move beyond the barrier in an up stream direction. However, the rod 6 may be easily moved out of a vertical position by the force of debris coming in contact with the rods and overcoming the weight of the horizontal portions 7 of the rods. After the passage of the trash, the rods are automatically returned to vertical position, and in engagement with the bar 10. If the force of the stream is great, the weights 8 may be moved toward the extremities of the horizontal portions 7 of the rod 6, thereby resisting with sufficient degree the force of the stream, and insuring the return of the rods to a vertical position after the passage therethrough of the trash.

Thus it will be seen that I have provided a simple and novel form of fish stop, which is adapted for use in different streams, each having different degrees of flow, with means for permitting the passage of debris therethrough without providing an opportunity for the passage of fish.

While I have illustrated and described my invention with some degree of particularity, I realize that in practice various alterations thereover may be made, and I therefore reserve the right and privilege of changing the form of the details of construction, or otherwise altering the arrangement of the correlated parts, without departing from the spirit of the invention or the scope of the appended claims.

Having thus fully described my invention what I claim as new and desire to secure by Letters Patent, is:—

1. A fish stop including a frame adapted to be mounted across a stream, a plurality of depending rods suspended for oscillation and for movement relative to each other from the frame, means for preventing movement of the rods in one direction, and means yieldable to resist their movement in the opposite direction.

2. A fish stop including a frame adapted to be mounted across a stream, a plurality of depending rods suspended for oscillation and for movement relative to each other from the frame, means for preventing oscillation of the rods in one direction, and weights on the rods for resisting their movement in an opposite direction.

3. A fish stop including a frame adapted to be mounted across a stream, a plurality of vertical depending rods suspended for oscillation and for movement relative to each other from the frame, a stop for preventing movement of the rods out of a vertical position in one direction, and weights on the rods for resisting their movement out of a vertical position in the opposite direction.

4. A fish stop including a frame having a horizontal bar, a plurality of independently movable rods suspended for oscillation relative to each other from the bar, said rods being provided with weighted horizontal portions, to resist their oscillation in one direction, and a stop mounted on the frame and engageable by the rods to prevent their movement in the opposite direction.

In testimony whereof I affix my signature in presence of two witnesses.

ARTHUR J. GUSTAFSON.

Witnesses:
A. THOSTENSON,
O. G. VELDEY.

Copies of this patent may be obtained for five cents each, by addressing the "Commissioner of Patents, Washington, D. C."